(12) United States Patent
Park et al.

(10) Patent No.: US 11,466,814 B2
(45) Date of Patent: Oct. 11, 2022

(54) SOLID HYDROGEN STORAGE DEVICE

(71) Applicants: HYUNDAI MOTOR COMPANY, Seoul (KR); KIA MOTORS CORPORATION, Seoul (KR)

(72) Inventors: Ji Hye Park, Seoul (KR); Kyung Moon Lee, Uiwang-si (KR); Dong Hoon Nam, Suwon-si (KR); Young Jin Cho, Gimhae-si (KR); Seung Hyeon Choi, Suwon-si (KR); Yun Su Lee, Yeoju-si (KR); Hoon Mo Park, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 512 days.

(21) Appl. No.: 16/689,313

(22) Filed: Nov. 20, 2019

(65) Prior Publication Data

US 2020/0278085 A1   Sep. 3, 2020

(30) Foreign Application Priority Data

Feb. 28, 2019  (KR) .................. 10-2019-0024314
May 27, 2019  (KR) .................. 10-2019-0061819

(51) Int. Cl.
*F17C 7/00*  (2006.01)
*F17C 11/00* (2006.01)

(52) U.S. Cl.
CPC .............. *F17C 11/005* (2013.01); *F17C 7/00* (2013.01); *F17C 2221/012* (2013.01); *F17C 2223/0138* (2013.01); *F17C 2260/031* (2013.01)

(58) Field of Classification Search
CPC .... F17C 11/005; F17C 7/00; F17C 2221/012; F17C 2223/0138; F17C 2260/031
See application file for complete search history.

(56) References Cited

U.S. PATENT DOCUMENTS

| | | | | |
|---|---|---|---|---|
| 4,723,595 A | * | 2/1988 | Yasunaga ............. | C01B 3/0005 62/480 |
| 5,014,771 A | * | 5/1991 | Lederer et al. .......... | F28F 1/02 228/183 |
| 5,071,174 A | * | 12/1991 | Griffin .................. | F16L 41/084 285/187 |
| 2020/0263936 A1 | * | 8/2020 | Park ..................... | C01B 3/0026 |

FOREIGN PATENT DOCUMENTS

| | | |
|---|---|---|
| JP | 4658238 B2 | 3/2011 |
| KR | 10-2017-0011161 A | 2/2017 |
| KR | 10-2018-0068716 A | 6/2018 |
| KR | 10-1915624 B1 | 1/2019 |
| WO | 2011/103627 A1 | 9/2011 |

* cited by examiner

*Primary Examiner* — Stephen J Castellano
(74) *Attorney, Agent, or Firm* — Lempia Summerfield Katz LLC

(57) ABSTRACT

A solid hydrogen storage device provides an improved heat-transfer efficiency by improving the contact properties between heat-exchange tubes and heat-transfer fins. The solid hydrogen storage device includes a heat-transfer fin including a plurality of tube through holes, a heating tube, and a cooling tube. The heating tube and the cooling tube respectively extend through the tube through holes, and the heating tube and the cooling tube have different coefficients of thermal expansion.

10 Claims, 5 Drawing Sheets

SOLID HYDROGEN STORAGE DEVICE

CROSS-REFERENCE TO RELATED APPLICATION

This application claims priority to and the benefit of Korean Patent Application Nos. 10-2019-0024314, filed on Feb. 28, 2019 and 10-2019-0061819, filed on May 27, 2019, the entire contents of which are incorporated herein by reference.

FIELD

The present disclosure relates to a solid hydrogen storage device for improving heat-transfer efficiency.

BACKGROUND

The statements in this section merely provide background information related to the present disclosure and may not constitute prior art.

A metal hydride-based solid hydrogen storage allows a reversible reaction between metal and hydrogen molecules. In particular, hydrogen molecules are decomposed from metal and the hydrogen is released when heat energy is supplied whereas the hydrogen is combined with the metal again and stored in the metal when the hydrogen is supplied under pressure.

Magnesium hydride ($MgH_2$) is one of the representative metal hydrides capable of storing a large amount of hydrogen per unit mass (hydrogen storage density: 7.8 wt %).

However, we have discovered that because the hydrogen release reaction occurs at a high temperature and the amount of power required for heating increases accordingly, it is desired to improve the thermal efficiency of a hydrogen storage system.

Details described as the background art are intended merely for the purpose of promoting the understanding of the background of the present disclosure and should not be construed as an acknowledgment of the prior art that is previously known to those of ordinary skill in the art.

SUMMARY

The present disclosure provides a solid hydrogen storage device having improved heat-transfer efficiency by improving contact properties between heat-exchange tubes and heat-transfer fins.

In one form of the present disclosure, a solid hydrogen storage device includes: a heat-transfer fin including a plurality of tube through holes formed therein, and a heating tube and a cooling tube, which respectively extend through the plurality of tube through holes. In particular, the heating tube has a first coefficient of thermal expansion and the cooling tube has a second coefficient of thermal expansion, and wherein the first coefficient of the thermal expansion is different from the second coefficient of thermal expansion.

The first coefficient of thermal expansion of the heating tube may be greater than the second coefficient of thermal expansion of the cooling tube.

In one form, the first coefficient of thermal expansion of the heating tube is determined based on a maximum expansion of the heating tube in a radial direction at an activation temperature at which an amount of hydrogen discharged from a hydrogen storage element is maximized.

In another form, the maximum expansion of the heating tube at the activation temperature is within a spacing clearance defined between an outer peripheral surface of the heating tube and an inner peripheral surface of the respective tube through hole.

The heating tube may be made of a material having the first coefficient of thermal expansion such that a maximum extent of thermal expansion of the heating tube in a radial direction at an activation temperature is equal to or maximally close to a spacing clearance defined between an outer peripheral surface of the heating tube and an inner peripheral surface of the respective tube through hole. The activation temperature is a temperature at which an amount of hydrogen discharged from a hydrogen storage element is maximized.

The cooling tube may be made of a material having the second coefficient of thermal expansion such that a maximum extent of thermal contraction of the cooling tube in a radial direction at an activation temperature is minimized. At the activation temperature, an amount of hydrogen stored in a hydrogen storage element is maximized.

Each tube through hole of the plurality of tube through holes may include a hole extension extended from a periphery of the respective tube through hole in a longitudinal direction, and the heating tube or the cooling tube extends through a corresponding hole extension among the hole extensions extended from the tube through holes.

Each of the hole extensions may be configured to surround the corresponding heating tube or the cooling tube.

Each of the hole extensions may extend from the periphery of the respective tube through hole in an upward direction and a downward direction.

Each of the hole extensions may be integrally secured to the periphery of the respective tube through hole.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
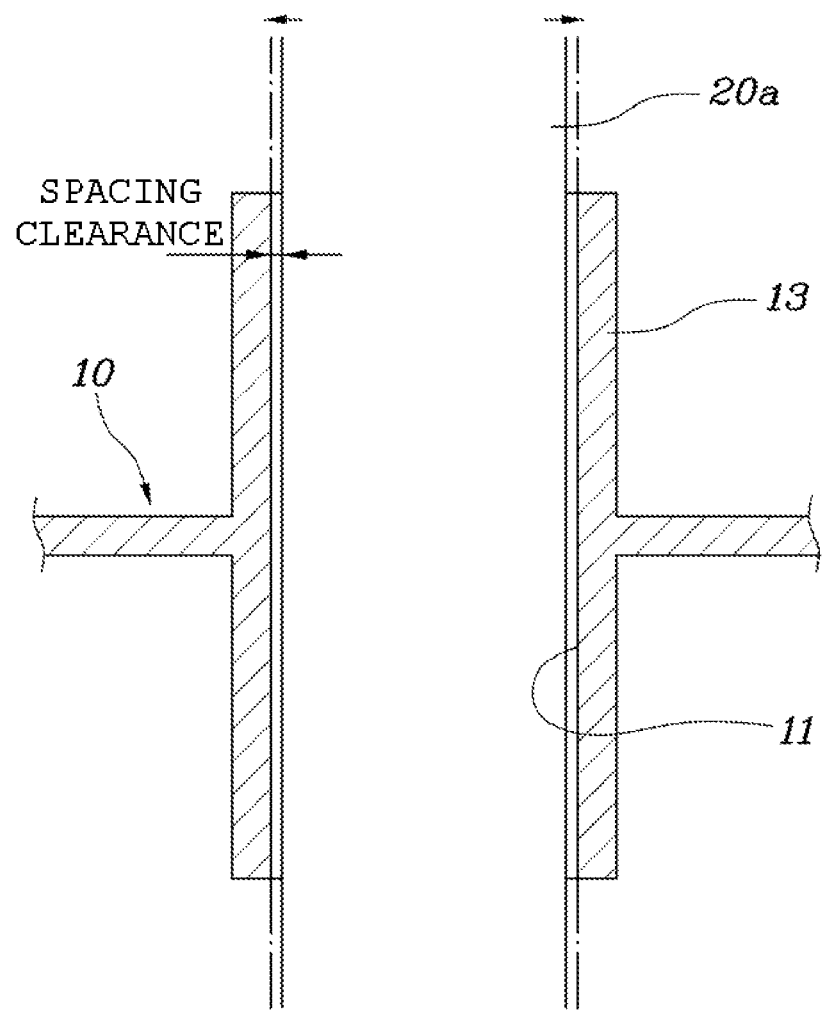
Figure 5:
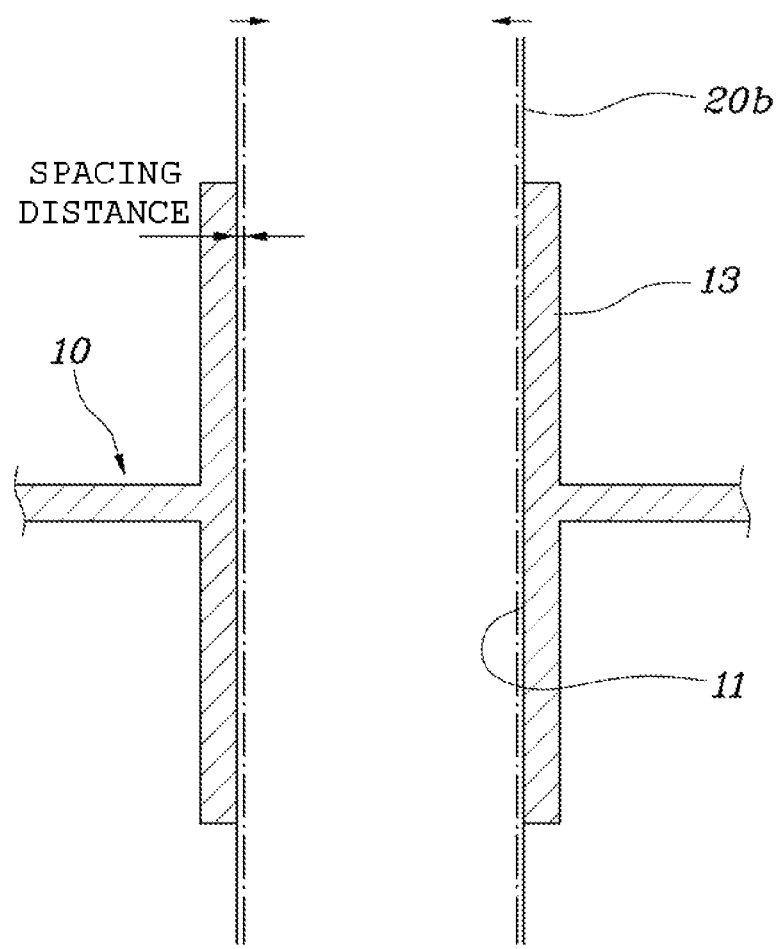

FIG. 4 is a view illustrating a coupling structure between a heating tube and the heat-transfer fin according to one form of the present disclosure and a change in the shape of the heating tube due to thermal expansion; and FIG. 5 is a view illustrating a coupling structure between a heating tube and the heat-transfer fin according to one form of the present disclosure and a change in the shape of the heating tube due to thermal contraction.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will now be described in detail with reference to the accompanying drawings.

Figure 1:
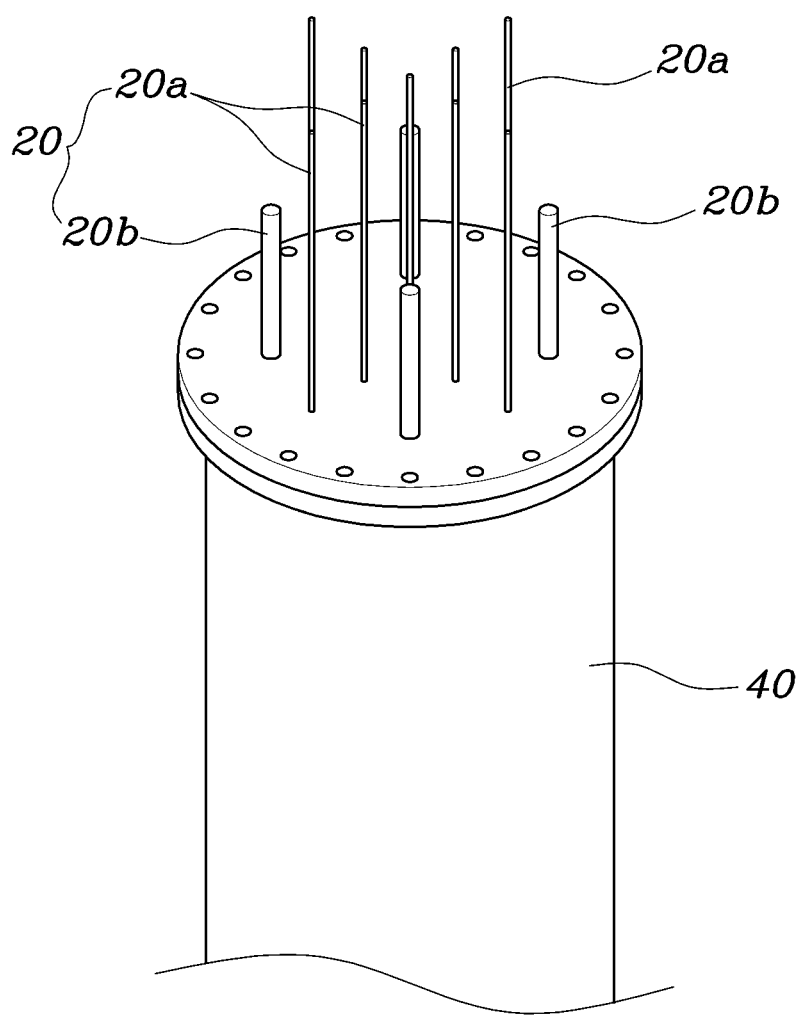
FIG. 1 is a view illustrating the configuration of a storage container of a solid hydrogen storage device according to one form of the present disclosure.
Figure 2:
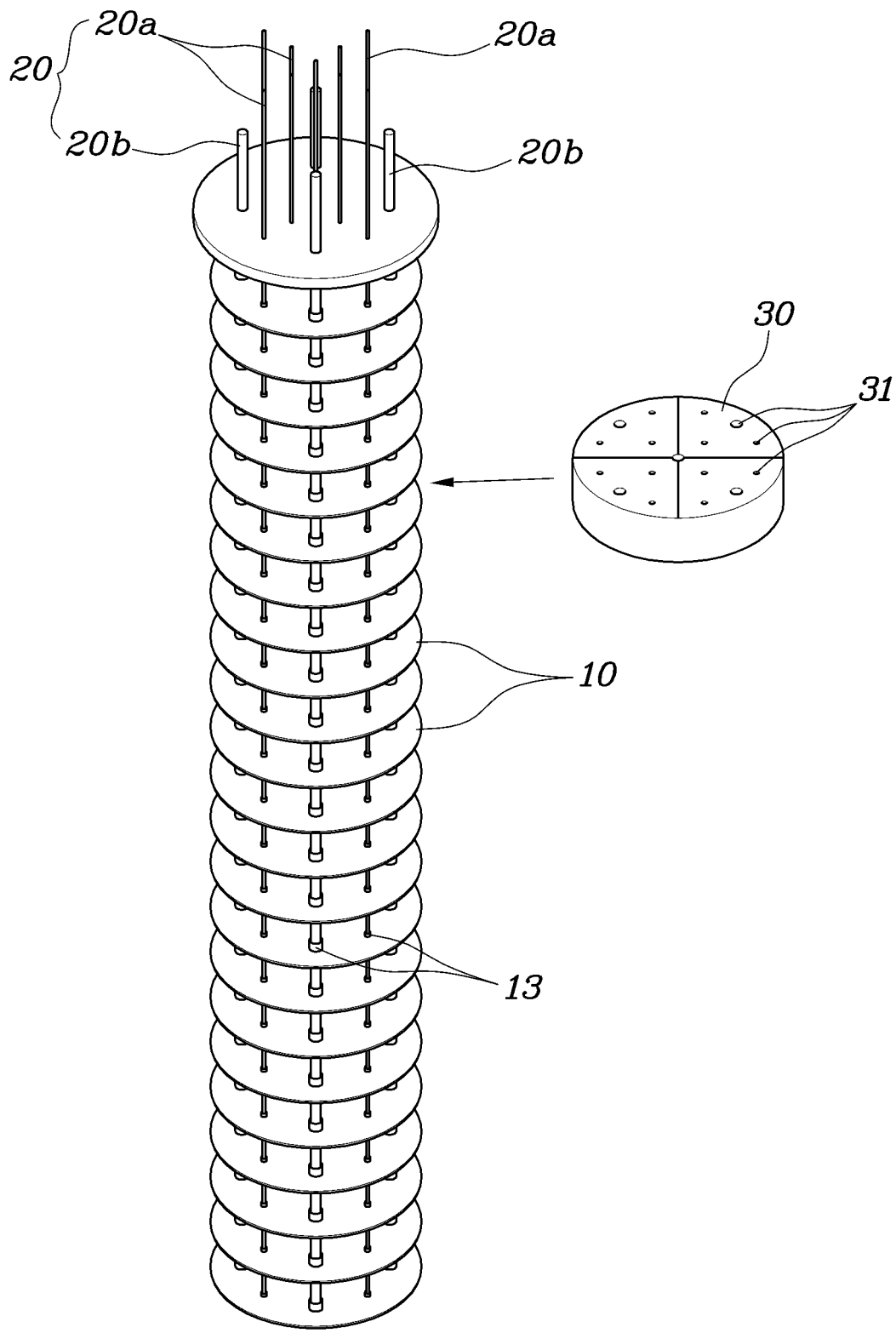
FIG. 2 is a view illustrating the assembled state of heat-exchange tubes, heat-transfer fins and hydrogen storage elements according to one form of the present disclosure.

A solid hydrogen storage device according to one form of the present disclosure will be described with reference to FIGS. 1 and 2. The solid hydrogen storage device includes a cylindrical storage container 40 and a plurality of heat-exchange tubes 20, which are disposed in the storage container 40 in the axial direction.

The heat-exchange tubes 20 includes metal heating tubes 20*a* and metal cooling tubes 20*b*, which are arranged at predetermined radii and at regular intervals about the axis of the storage container 40.

The storage container 40 is provided therein with a plurality of disc-shaped hydrogen storage elements 30, which are made of a material such as $MgH_2$, $NaAlH_4$ or the like so as to store and discharge hydrogen. Here, each of the hydrogen storage elements 30 has formed therein through holes 31, which are formed at positions corresponding to those of the heat-exchange tubes 20 so as to allow the heat-exchange tubes 20 to extend therethrough, thereby supplying heat to the hydrogen storage elements 30 from the heat-exchange tubes 20.

A heat-transfer fin 10, which has excellent heat conductivity, is provided between two adjacent hydrogen storage elements 30 for improvement of heat transfer to the hydrogen storage elements 30 from the heat-exchange tubes 20.

Figure 3:
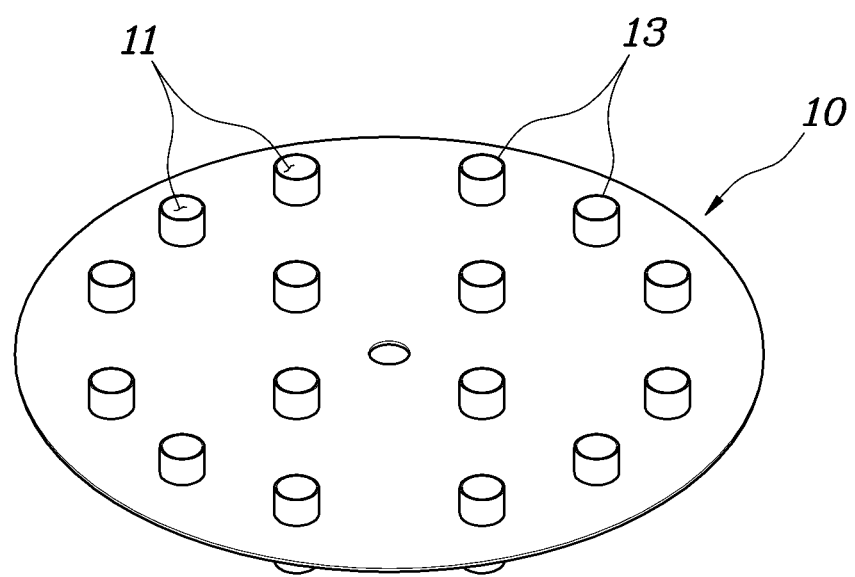
FIG. 3 is a view illustrating the shape of the heat-transfer fin according to one form of the present disclosure.

To this end, each of the heat-transfer fins 10 includes a plurality of tube through holes 11 through which the heating tubes 20*a* and the cooling tubes 20*b* extend, as illustrated in FIG. 3.

In particular, the heating tube 20*a* and the cooling tube 20*b* are configured to have different coefficients of thermal expansion.

In one form, the heating tube 20*a* is made of a material having a coefficient of thermal expansion higher than that of the cooling tube 20*b*. For example, the heating tube 20*a* may be made of Zn, Al, Mn or the like, which has a relatively high coefficient of thermal expansion, and the cooling tube 20*b* may be made of W, Mo, Fe or the like, which has a relatively low coefficient of thermal expansion.

However, the materials of the heating tube 20*a* and the cooling tube 20*b* are not limited to the above-mentioned materials.

Specifically, the heating tube 20*a* may be made of a material having a coefficient of thermal expansion such that the maximum extent of thermal expansion of the heating tube 20*a* in a radial direction at the activation temperature, at which the amount of hydrogen that is discharged from the hydrogen storage element 30 is maximized, is equal to or maximally close to a spacing clearance defined between the outer peripheral surface of the heating tube 20*a* and the inner peripheral surface of the tube through hole 11. In other words, the material for the heating tube 20*a* is selected based on a coefficient of thermal expansion determining a maximum expansion of the heating tube in the radial direction at the activation temperature at which the maximum amount of hydrogen discharged is from the hydrogen storage element 30. In one form, to improve heat transfer, the spacing clearance is minimized when the heating tube 20*a* is maximally expanded, namely an outer diameter of the expanded heating tube 20*a* is equal, substantially equal to a diameter of the inner peripheral surface of the tube through hole 11.

Meanwhile, the cooling tube 20*b* may be made of a material having a coefficient of thermal expansion such that the maximum extent of thermal contraction of the cooling tube 20*b* in a radial direction at the activation temperature, at which the amount of hydrogen that is stored in the hydrogen storage element 30 is maximized, is minimized.

A predetermined spacing clearance is defined between the outer peripheral surface of each of the heating tube 20*a* and the cooling tube 20*b* and the inner peripheral surface of the tube through hole 11. Because the heating tube 20*a* is made of a material having a relatively high coefficient of thermal expansion, the amount of thermal expansion of the heating tube 20*a* is high upon heating thereof. Consequently, not only the spacing distance between the heating tube 20*a* and the heat-transfer fin 10 but also the spacing distance between the heating tube 20*a* and the hydrogen storage element 30 are decreased, thereby improving heat-transfer efficiency, as illustrated in FIG. 4.

Meanwhile, the cooling tube 20*b* may be made of a material having a relatively low coefficient of thermal expansion and may be fitted into the tube trough hole 11 in an interference fitting manner.

Accordingly, since the amount of thermal contraction of the cooling tube 20*b* is reduced or minimized upon cooling thereof as illustrated in FIG. 5 owing to the low coefficient of thermal expansion thereof, not only is the spacing distance between the inner surface of the tube through hole 11 and the cooling tube 20*b* reduced or minimized, the spacing distance between the cooling tube 20*b* and the hydrogen storage element 30 is also reduced or minimized, thereby reducing or minimizing heat loss and optimizing efficiency of heat transfer.

For reference, because the extent of thermal expansion of the heating tube 20*a* may be different from the extent of thermal contraction of the cooling tube 20*b*, the spacing distance illustrated in FIG. 4 may be different from the spacing clearance illustrated in FIG. 5.

In one form of the present disclosure, the surface area of the tube through hole 11 may be increased in order to increase the contact area between the heating and cooling tubes 20*a* and 20*b* and the heat-transfer fin 10.

To this end, the heat-transfer fin 10 may be provided with a hole extension 13, which projects from the periphery of the tube through hole 11 in the direction in which the heating tube 20*a* and the cooling tube 20*b* are inserted into the tube through hole 11, as illustrated in FIGS. 4 and 5.

In another form, the heat-transfer fin 10 is configured to have a disc shape, and the hole extension 13 extends from the heat-transfer fin 10 in the direction perpendicular to the surface of the disc. Here, each of the hole extensions 13 may be configured so as to surround a corresponding one of the heating tube 20*a* and the cooling tube 20*b*.

In other words, the area of the inner peripheral surface of the tube through hole 11 is increased by virtue of the hole extension 130, allowing the contact area between the heat-transfer fin 10 and the heating and cooling tube 20*a* and 20*b* to be increased, thereby improving the heat-transfer efficiency by the heat-exchange tube 20.

Furthermore, the hole extension 13 may project from the upper and lower ends of the tube through hole 11 in opposite directions. In other words, since the hole extension 13 extends not only toward an adjacent hydrogen storage element 30 about the heat-transfer fin 10 but also toward the opposite adjacent hydrogen storage element 30, the heat-transfer efficiency between the heat-transfer fin 10 and the hydrogen storage element 30 is further improved.

The hole extension 13 may be integrally secured to the periphery of the tube through hole 11. In one form, the hole extension 13 is made of the same material as the heat-transfer fin 10.

As is apparent from the above description, since the heating tube 20a is made of a material having a relatively high coefficient of thermal expansion, the amount of thermal expansion of the heating tube 20a is high, and thus the spacing distance between the heating tube 20a and the heat-transfer fin 10 is decreased, thereby improving heat-transfer efficiency. Meanwhile, since the cooling tube 20b is made of a material having a relatively low coefficient of thermal expansion, the amount of thermal contraction of the cooling tube 20b is high, and thus the spacing distance between the cooling tube 20b and the heat-transfer fin 10 is decreased, thereby reducing or minimizing heat loss.

In addition, since the area of the inner peripheral surface of the tube through hole 11 is increased by virtue of the hole extension 13 formed at the tube through hole 11, the contact area between the heat-transfer fin 10 and the heat-exchange tube 20 is increased, thereby improving the heat-transfer efficiency by the heat-exchange tube 20.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A solid hydrogen storage device comprising:
   a heat-transfer fin including a plurality of tube through holes formed therein; and
   a heating tube and a cooling tube, which respectively extend through tube through holes of the plurality of tube through holes,
   wherein the heating tube has a first coefficient of thermal expansion and the cooling tube has a second coefficient of thermal expansion, and wherein the first coefficient of the thermal expansion is different from the second coefficient of thermal expansion.

2. The solid hydrogen storage device according to claim 1, wherein the first coefficient of thermal expansion of the heating tube is greater than the second coefficient of thermal expansion of the cooling tube.

3. The solid hydrogen storage device according to claim 2, wherein the first coefficient of thermal expansion of the heating tube is determined based on a maximum expansion of the heating tube in a radial direction at an activation temperature at which an amount of hydrogen discharged from a hydrogen storage element is maximized.

4. The solid hydrogen storage device according to claim 3, wherein the maximum expansion of the heating tube at the activation temperature is within a spacing clearance defined between an outer peripheral surface of the heating tube and an inner peripheral surface of the respective tube through hole.

5. The solid hydrogen storage device according to claim 1, wherein the heating tube is made of a material having the first coefficient of thermal expansion such that a maximum extent of thermal expansion of the heating tube in a radial direction at an activation temperature is equal to or maximally close to a spacing clearance defined between an outer peripheral surface of the heating tube and an inner peripheral surface of the respective tube through hole, and
   wherein the activation temperature is a temperature at which an amount of hydrogen discharged from a hydrogen storage element is maximized.

6. The solid hydrogen storage device according to claim 1, wherein the cooling tube is made of a material having the second coefficient of thermal expansion such that a maximum extent of thermal contraction of the cooling tube in a radial direction at an activation temperature is minimized, and
   wherein at the activation temperature, an amount of hydrogen stored in a hydrogen storage element is maximized.

7. The solid hydrogen storage device according to claim 1, wherein each tube through hole of the plurality of tube through holes includes a hole extension extended from a periphery of the respective tube through hole in a longitudinal direction, and wherein the heating tube or the cooling tube extends through a corresponding hole extension among the hole extensions extended from the tube through holes.

8. The solid hydrogen storage device according to claim 7, wherein each of the hole extensions is configured to surround the corresponding heating tube or the cooling tube.

9. The solid hydrogen storage device according to claim 7, wherein each of the hole extensions extends from the periphery of the respective tube through hole in an upward direction and a downward direction.

10. The solid hydrogen storage device according to claim 7, wherein each of the hole extensions is integrally secured to the periphery of the respective tube through hole.

* * * * *